United States Patent
Lubischer et al.

(10) Patent No.: US 11,220,285 B2
(45) Date of Patent: Jan. 11, 2022

(54) ROTATION CONTROL SYSTEM FOR A STEERING WHEEL AND METHOD

(71) Applicant: STEERING SOLUTIONS IP HOLDING CORPORATION, Saginaw, MI (US)

(72) Inventors: Frank P. Lubischer, Commerce Township, MI (US); Richard K. Riefe, Saginaw, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 172 days.

(21) Appl. No.: 16/741,308

(22) Filed: Jan. 13, 2020

(65) Prior Publication Data
US 2020/0148249 A1   May 14, 2020

Related U.S. Application Data

(63) Continuation of application No. 15/827,511, filed on Nov. 30, 2017, now Pat. No. 10,766,518, which is a continuation of application No. 14/984,311, filed on Dec. 30, 2015, now abandoned.

(60) Provisional application No. 62/184,511, filed on Jun. 25, 2015.

(51) Int. Cl.
| | |
|---|---|
| *B60Q 1/00* | (2006.01) |
| *B62D 6/00* | (2006.01) |
| *G05D 1/02* | (2020.01) |
| *B62D 1/181* | (2006.01) |
| *B60N 2/02* | (2006.01) |
| *B62D 1/04* | (2006.01) |
| *B62D 1/183* | (2006.01) |

(52) U.S. Cl.
CPC .................................. *B62D 1/183* (2013.01)

(58) Field of Classification Search
None
See application file for complete search history.

(56) References Cited

U.S. PATENT DOCUMENTS

| | | | | |
|---|---|---|---|---|
| 5,826,677 A * | 10/1998 | Nishizaki | ............. | B62D 5/0835 180/421 |
| 5,835,868 A * | 11/1998 | McElroy | ............. | B60R 25/1001 701/2 |
| 8,666,607 B2 * | 3/2014 | Kojo | ..................... | B62D 5/008 701/43 |
| 9,150,224 B2 * | 10/2015 | Yopp | ..................... | B60W 50/10 |
| 9,771,101 B2 * | 9/2017 | Mitsumoto | .......... | B62D 5/0463 |
| 9,809,155 B2 * | 11/2017 | Watz | ..................... | B62D 1/183 |

(Continued)

*Primary Examiner* — Adam D Tissot
(74) *Attorney, Agent, or Firm* — Dickinson Wright PLLC

(57) ABSTRACT

A rotation control system for a steering system of a vehicle includes a steering shaft. The rotation control system also includes at least one component operatively coupled to the steering shaft, the steering shaft switchable between a rotational condition and a non-rotational condition during operation of the vehicle, the rotational condition occurring during a manual driving mode and the non-rotational condition occurring during an autonomous driving mode. The rotational control system further includes a condition switching device for allowing a user to switch between the rotational condition and the non-rotational condition, the condition switching device comprising at least one of a switch, a button, and a voice prompt.

17 Claims, 2 Drawing Sheets

(56) References Cited

U.S. PATENT DOCUMENTS

2013/0002416 A1* 1/2013 Gazit ................ B62D 15/0255
340/438
2017/0151975 A1* 6/2017 Schmidt ................ B62D 1/183

* cited by examiner

ROTATION CONTROL SYSTEM FOR A STEERING WHEEL AND METHOD

CROSS-REFERENCE TO RELATED APPLICATIONS

This application is a continuation of U.S. patent application Ser. No. 15/827,511, filed Nov. 30, 2017, which is a continuation of U.S. patent application Ser. No. 14/984,311, filed Dec. 30, 2015, which claims priority to U.S. Provisional Patent Application Ser. No. 62/184,511, filed Jun. 25, 2015, all of which are incorporated herein by reference in their entirety.

BACKGROUND

The embodiments described herein relate to steering wheel assemblies and, more particularly, to a rotation control system for a steering wheel.

As autonomously driven vehicles are developed, a number of opportunities will evolve related to entertainment and functionality for drivers. Steering wheels are commonly limited to standard driving positions due to the need for a driver to handle the steering wheel during operation of the vehicle. These limitations may be unnecessary during an autonomous driving mode of a vehicle.

SUMMARY OF THE DISCLOSURE

According to one aspect of the disclosure, a rotation control system for a steering system of a vehicle includes a steering shaft. The rotation control system also includes at least one component operatively coupled to the steering shaft, the steering shaft switchable between a rotational condition and a non-rotational condition during operation of the vehicle, the rotational condition occurring during a manual driving mode and the non-rotational condition occurring during an autonomous driving mode. The rotational control system further includes a condition switching device for allowing a user to switch between the rotational condition and the non-rotational condition, the condition switching device comprising at least one of a switch, a button, and a voice prompt.

According to another aspect of the disclosure, an autonomous vehicle driving system includes a controller for providing a plurality of autonomous driving functions with a plurality of controller subsystems for a vehicle, wherein one of the controller subsystems comprises a steering shaft rotation control system. The rotation control system includes a steering shaft. The rotation control system also includes at least one component operatively coupled to the steering shaft, the steering shaft switchable between a rotational condition and a non-rotational condition during operation of the vehicle, the rotational condition occurring during a manual driving mode and the non-rotational condition occurring during an autonomous driving mode. The rotation control system further includes a condition switching device for allowing a user to switch between the rotational condition and the non-rotational condition, the condition switching device comprising at least one of a switch, a button, and a voice prompt.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
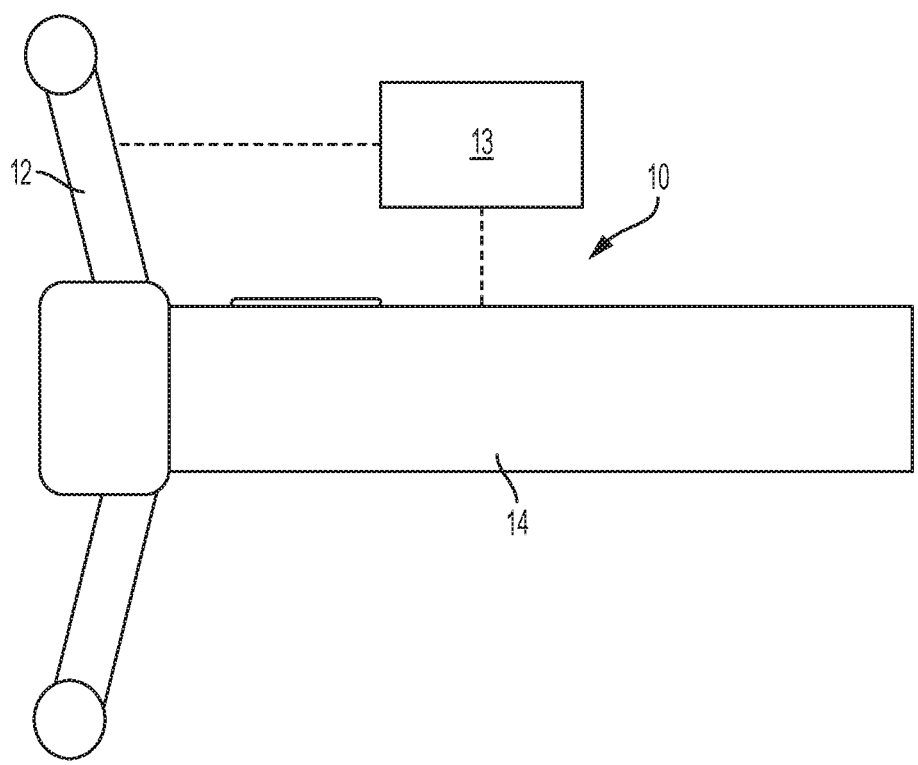
FIG. 1 schematically illustrates a steering wheel having a rotation control system.

Referring now to the Figures, where the invention will be described with reference to specific embodiments, without limiting same, a rotation control system 10 for a steering wheel 12 is provided. The rotation control system 10 facilitates switching between a rotatable condition of the steering wheel 12 and a non-rotatable condition of the steering wheel 12. Such control is advantageous in a vehicle that is capable of operating in an autonomous driving mode. Autonomous driving refers to vehicles that are configured to perform operations without continuous input from a driver (e.g., steering, accelerating, braking etc.) and may be equipped with Advanced Driver Assist System(s) (ADAS) to allow the vehicle to be autonomously controlled using sensing, steering, and/or braking technology. The ADAS includes at least one controller 13 that is in operative communication with a plurality of components, including the steering wheel 12 and the steering shaft described below. When the ADAS system is activated, the steering wheel is not required for vehicle control and, therefore, rotation of the steering wheel is not required during the autonomous driving mode. Fixing the steering wheel 12 in a non-rotational condition provides opportunities for a driver to use the steering wheel 12 as a workspace or armrest, for example. Furthermore, non-rotation of the steering wheel 12 may be desirable in a self-steering mode due to the potential for a rotating wheel to be an inducement for the driver to take hold of the steering wheel 12 inadvertently or unnecessarily, thus possibly leading to unwanted disengagement of the self-driving mode.

The embodiments described herein provide a steering shaft 14 that is operatively coupled to the steering wheel 12 and includes components of the rotation control system 10 to allow the steering wheel to be switched to a non-rotational condition that prevents rotation of the steering wheel 12, even while other steering components, such as all or portions of the steering shaft 14, are rotating during the autonomous driving mode. The steering wheel 12 is a single steering wheel that rotates, or remains stationary, at a uniform rate. In other words, no parts of the steering wheel rotate at different rates. The hub of the steering wheel and the rim of the steering wheel rotate together and no part of the steering wheel detaches from another part of the steering wheel.

The steering shaft 14 is equipped with at least one mechanism that facilitates switching between the rotational condition and non-rotational condition of the steering wheel 12. The mechanism(s) may be mechanical, electrical, or a combination thereof In one embodiment, the rotation control system 10 physically decouples the steering shaft 14 from a steering gear and road wheels. The decoupling may occur at any portion along the length of the steering shaft 14, including an end proximate the steering wheel 12 or an end proximate the steering gear, or any location therebetween. In another embodiment, the system 10 deactivates steering wheel rotation in a "steer-by-wire" vehicle. For example, electrical deactivation of a component that provides rotational feedback to the steering wheel 12 is made to halt rotation of the steering wheel 12. In another embodiment, the system 10 counter-rotates the steering shaft 14. It is to be understood that the non-rotational condition may be achieved by alternative suitable methods.

Irrespective of the precise control employed to cause non-rotation of the steering wheel 12 during the autonomous driving mode, the driver may deactivate the autonomous driving mode by a prompt (e.g., "handshake"), such as a driver applied rotation or torque of the steering wheel 12. Alternative prompts may be used with a switch, button, handle, voice prompt, etc. Regardless of the prompt, the autonomous driving mode is ceased and driver control of steering is resumed subsequent to the prompt.

While the steering wheel 12 is in the non-rotational condition, the steering wheel 12 may be employed as a functional or entertainment related structure. For example, the steering wheel 12 may be tilted to a substantially horizontal position, or any other angle, while the vehicle is in an autonomous driving mode. This enables for non-steering uses of the steering wheel 12. In one embodiment, non-rotation allows the steering wheel 12 to be used as a tray table to rest arms or objects on. For example, a cell phone or laptop may be placed thereon for use during the autonomous driving mode. In another embodiment, forward retraction of the steering wheel 12 and steering shaft 14 toward the instrument panel of the vehicle enlarges the cabin space for additional driver comfort and convenience. In yet another embodiment, the non-rotating steering wheel provides a platform for electronic devices monitoring the cabin, driver, and vehicle controls due to the stationary orientation of the steering wheel.

Figure 2:
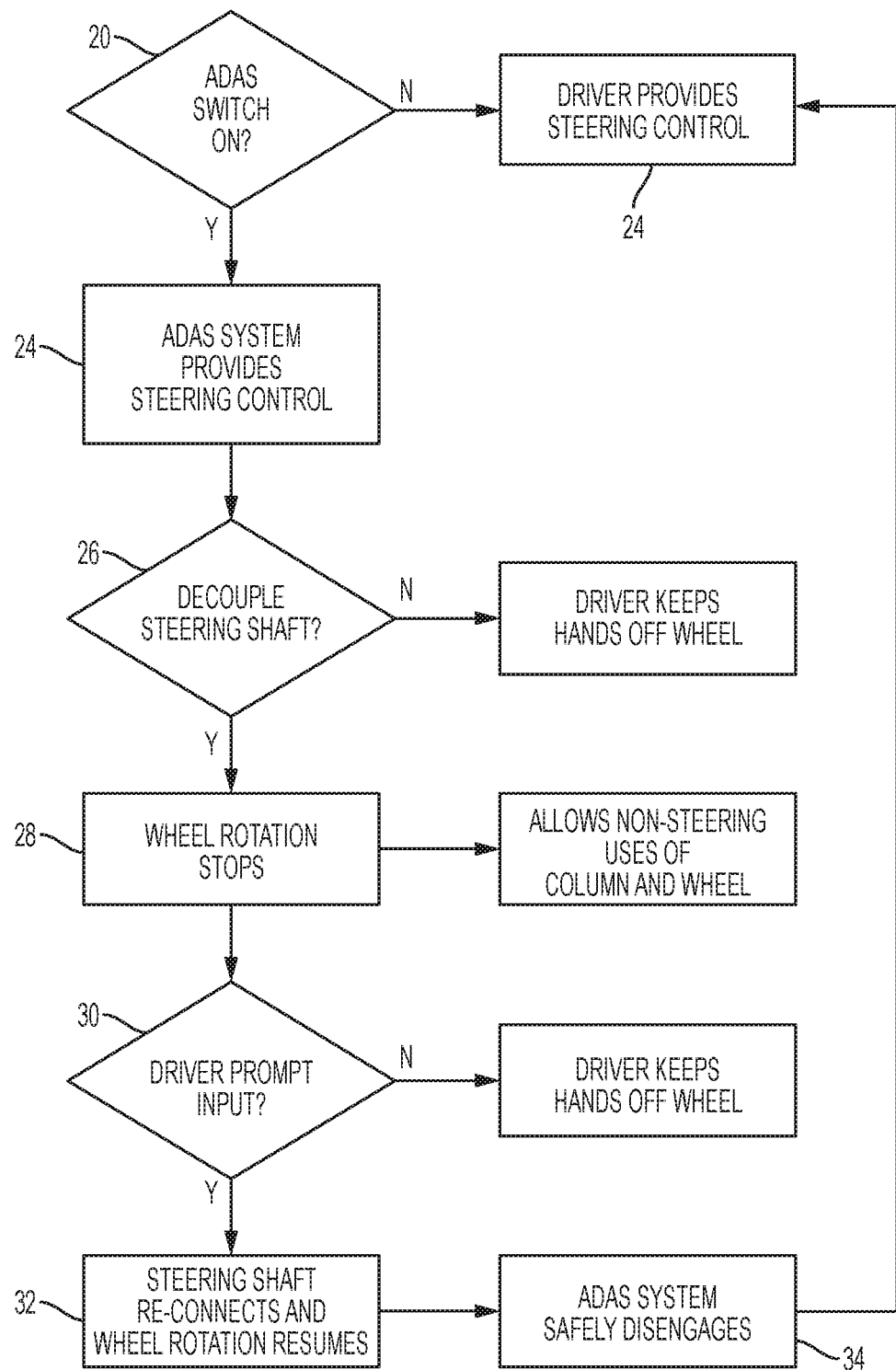
FIG. 2 is a flow diagram illustrating a method of operation of the rotation control system.

Referring to FIG. 2, a method of controlling rotation of the steering wheel is illustrated in the form of a flow diagram. The method includes determining 20 if the ADAS is activated. If it is not activated, the driver provides steering control of the vehicle 22. If activated, the ADAS system provides steering control 24. In an activated state, it is determined 26 if the steering shaft is decoupled from the steering shaft gear or otherwise prevents rotation of the steering wheel. If the steering shaft is decoupled, the steering wheel enters the non-rotational condition 28 and the steering wheel may be employed for non-steering uses. When the driver desires to regain steering control of the vehicle, the driver prompts the ADAS, such as with gripping of the steering wheel 30. Once the proper prompt is provided, the steering wheel 12 is permitted to be rotated by any, of the processes described above in connection with decoupling or deactivation of the steering wheel 12. For example, mechanical coupling may be made to re-connect 32 the necessary components of the steering shaft 14 with the steering wheel 12. Alternatively, electrical activation may be employed in a "steer-by-wire" embodiment to allow the steering wheel 12 to resume rotation. Additional suitable re-connection or activation methods may be employed. Once steering wheel 12 rotation is permitted and the user is well-suited to control steering of the vehicle, the ADAS system disengages 34.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A rotation control system for a steering system of a vehicle comprising:
    a steering shaft;
    at least one component operatively coupled to the steering shaft, the steering shaft switchable between a rotational condition and a non-rotational condition during operation of the vehicle, the rotational condition occurring during a manual driving mode and the non-rotational condition occurring during an autonomous driving mode; and
    a condition switching device for allowing a user to switch between the rotational condition and the non-rotational condition, the condition switching device comprising at least one of a switch, a button, and a voice prompt.

2. The rotation control system of claim 1, wherein the entire steering shaft remains stationary in the non-rotational condition.

3. The rotation control system of claim 1, wherein the steering shaft comprises a first portion and a second portion, wherein the first portion remains stationary in the non-rotational condition and the second portion rotates in the non-rotational condition.

4. The rotation control system of claim 3, wherein the at least one component decouples the first portion of the steering shaft from the second portion of the steering shaft.

5. The rotation control system of claim 1, wherein the at least one component decouples the steering shaft from a steering shaft gear operatively coupled to road wheels of the vehicle.

6. The rotation control system of claim 1, wherein the at least one component comprises a mechanical device.

7. The rotation control system of claim 1, wherein the at least one component comprises an electrical device.

8. The rotation control system of claim 7, wherein the electrical device de-activates a component operatively coupled to the steering shaft.

9. An autonomous vehicle driving system comprising:
    a controller for providing a plurality of autonomous driving functions with a plurality of controller subsystems for a vehicle, wherein one of the controller subsystems comprises a steering shaft rotation control system, the rotation control system comprising:
    a steering shaft;
    at least one component operatively coupled to the steering shaft, the steering shaft switchable between a rotational condition and a non-rotational condition during operation of the vehicle, the rotational condition occurring during a manual driving mode and the non-rotational condition occurring during an autonomous driving mode; and
    a condition switching device for allowing a user to switch between the rotational condition and the non-rotational condition, the condition switching device comprising at least one of a switch, a button, and a voice prompt.

10. The system of claim 9, wherein the entire steering shaft remains stationary in the non-rotational condition.

11. The system of claim 9, wherein the steering shaft comprises a first portion and a second portion, wherein the first portion remains stationary in the non-rotational condition and the second portion rotates in the non-rotational condition.

12. The system of claim 11, wherein the at least one component decouples the first portion of the steering shaft from the second portion of the steering shaft.

13. The system of claim 9, wherein the at least one component decouples the steering shaft from a steering shaft gear operatively coupled to road wheels of the vehicle.

14. The system of claim 9, wherein the at least one component comprises a mechanical device.

15. The rotation control system of claim 9, wherein the at least one component comprises an electrical device.

16. The rotation control system of claim 15, wherein the electrical device de-activates a component operatively coupled to the steering shaft.

17. A rotation control system for a steering system comprising:
- a steering shaft operatively coupled to a steering input device; and
- at least one component operatively coupled to the steering shaft, the steering input device switchable between a rotational condition and a non-rotational condition, the rotational condition occurring during a manual driving mode and the non-rotational condition occurring during an autonomous driving mode, the steering shaft continuing to rotate during the non-rotational condition of the steering input device.

* * * * *